United States Patent

[11] 3,601,556

[72] Inventors Dexter P. Cooper, Jr.
Pasadena;
Arthur Rak, Huntington Beach, both of, Calif.

[21] Appl. No. 873,289
[22] Filed Nov. 3, 1969
[45] Patented Aug. 24, 1971
[73] Assignee Bell & Howell Company
Chicago, Ill.

[54] INFORMATION REPLAY METHODS AND APPARATUS
22 Claims, 6 Drawing Figs.

[52] U.S. Cl. .......... 179/100.1PS, 179/100.2 S, 179/100.2 Z, 274/4 C
[51] Int. Cl. .......... G11b 27/12
[50] Field of Search .......... 179/100.1 PS, 100.2 S, 100.3 D, 100.2 Z; 274/4 C, 4 B, 11 B; 352/72, 78, 92

[56] References Cited
UNITED STATES PATENTS

| | | | |
|---|---|---|---|
| 2,396,409 | 3/1946 | Berzer | 179/100.2 S |
| 2,683,568 | 7/1954 | Lindsay | 179/100.2 S |
| 2,913,538 | 11/1959 | Genevay | 179/100.2 S |
| 3,051,777 | 8/1962 | Lemelson | 178/6.6 |

*Primary Examiner*—Richard Murray
*Attorney*—Luc P. Benoit

ABSTRACT: Method and apparatus for selectively replaying a number of features recorded on a recording medium having a support in which adjustable markings are provided on the support for alternatively indicating preselections of the features for replay, and in which feature start indications on the recording medium cooperate with said markings in controlling the replay of said features.

INVENTOR.
DEXTER P. COOPER, JR.
ARTHUR RAK
BY [signature]
ATTORNEY

INVENTOR.
DEXTER P. COOPER, JR.
ARTHUR RAK
BY
[signature]
ATTORNEY

INVENTOR.
DEXTER P. COOPER, JR.
ARTHER RAK
BY

ATTORNEY

INFORMATION REPLAY METHODS AND APPARATUS

CROSS-REFERENCE TO RELATED APPLICATIONS

Part of the subject matter herein disclosed is claimed and/or disclosed in the following copending patent applications which are assigned to the assignee of the subject application and which herewith are incorporated by reference herein:

Ser. No. 873,288,Information Replay Methods and Apparatus, filed on Nov. 3 1969,by Peter G. Peterson, and Ser. No. 873,250,Information Relay Methods and Apparatus, filed on Nov. 3 1969,by Arthur Rak.

BACKGROUND

1. Field of the Invention

The subject invention relates to information recording and replay and, more particularly, to methods and apparatus for controlling the replay of a number of recorded features.

2. Prior Art

Throughout the years it has become customary to record several not necessarily interrelated features on the same recording medium. A typical although by no means exclusive case is the long play record which has several musical pieces recorded on each side . More recently, prerecorded magnetic tapes have been appearing on the market having a plurality of features recorded thereon.

These types of records and prerecorded tapes are generally well liked but have the frequently felt drawback that the selection of features provided by the producer does not always correspond to the listener's choice.

To overcome this drawback, dialing equipment has been provided which permits the listener to select certain of the features for replay. While prior art equipment of this type is capable of saving people from the tedium of having to listen to unwanted features, it generally requires in its operation considerable repetitive effort on the part of the listener.

Briefly, a suitable type of playback apparatus designed in accordance with relevant prior art principles would have a manually actuable pushbutton or dial-type selector by means of which recorded features could be preselected for replay preparatory to each playback operation. The flexible preselection facility thus provided is well adapted to situations in which the typical audience is composed of a large number of people most of which wish to make their own selection of features.

On the other hand, a highly flexible preselection facility becomes a burden in the case of individually owned and operated record or tape collections. In such situations, the individual in question is generally slow to change his opinion as to which features he wishes to listen to and which features he wishes to exclude from a playback of the record or tape. This being the case, an actuation of selector equipment prior to each replay of the record or tape for the mere purpose of repeating the selection of an already predetermined choice becomes a rather cumbersome chore which significantly derogates from the listener's enjoyment. '

BRIEF DESCRIPTION OF THE INVENTION

The subject invention overcomes these drawbacks and, from one aspect thereof, provides a method of selectively replaying a number of features recorded on a recording medium having a support, comprising the steps of providing adjustable markings on said support for alternatively indicating preselections of said features for replay, adjusting said markings for indicating a choice of one of said preselection of features for replay, sensing the impending start of each feature, instituting a feature replay operation, and controlling said feature replay operation in accordance with the adjustment of said markings and said sensing of the impending start of each feature to effect a replay of said chosen preselection of features.

From another aspect thereof, the invention provides a method of selectively replaying a number of features recorded on a recording medium having a support, comprising the steps of providing adjustable markings on said support for alternatively indicating preselections of said features for replay, adjusting said markings for indicating as to each feature whether the particular feature is to be replayed or is by bypassed, sensing the impending start of each feature, sensing said markings and advancing said recording medium at a playback speed in response to an indication that a feature is to be replayed and in response to a sensing of the impending start of that feature, and alternatively advancing said recording medium at a forward speed which is higher than said playback speed in response to an indication that a feature is to by bypassed, and replaying the features during which said recording medium is advanced at said playback speed.

From yet another aspect thereof, the invention provides a method of selectively replaying a number of features recorded on a recording medium having a support, comprising the steps of providing for each feature a marking on said support adjustable between a first position indicative of a preselection of a particular feature for replay, and a second position indicative of a desire to bypass the particular feature, adjusting each of said markings to designate each feature selectively for playback and for bypassing, respectively, instituting a playback operation, determining the impending start of each feature during said playback operation and instituting in response to each determination of the impending start of a feature a sensing operation for determining the position of the marking for the particular feature, advancing said recording medium at a playback speed in response to a determination that a markings is in said first position, and alternatively advancing said recording medium at a forward speed which is higher than said playback speed in response to a determination that a marking is in said second position, and replaying the features which said recording medium is advanced at said playback speed.

The invention also provides apparatus for selectively replaying a number of features recorded on a recording medium having a support and including indications of the impending start of each feature, comprising in combination adjustable markings on said support for alternatively indicating preselections of said features for replay, means for sensing said impending start indications on said recording medium, means connected to said sensing means for determining from said adjustable markings in response to each sensed impending start indication whether a particular feature is to be replayed, and means connected to said determining means for effecting a replay of each feature determined by said determining means for replay.

From a further aspect thereof, the invention provides apparatus for selectively replaying a number of features recorded on a recording medium having a support and including indications of the impending start of each feature, comprising in combination adjustable markings on said support for indicating as to each feature whether the particular feature is to be replayed or is to be bypassed, means responsive to said indications on said recording medium for effecting a sensing of said markings in response to each indication of an impending start of a particular feature to determine whether the particular feature is to be replayed, means connected to said sensing means for advancing said recording medium at a playback speed in response to an indication that a particular feature is to be replayed, and means operatively associated with said recording medium for replaying the features during which the recording medium is advanced at said playback speed.

From yet another aspect thereof, the invention provides apparatus for selectively replaying a number of features recorded on a recording medium having a support and including for each feature an indication of the impending start of the particular feature, comprising in combination a sequence of markings on said support, each marking being individually allocated to a feature and being selectively adjustable to a predetermined position to indicate that the particular feature is to be replayed, means for sequentially sensing said markings in incremental steps to determine as to each marking whether the particular marking is located in said predetermined position, means operatively associated with said recording medium and connected to said sensing means for actuating said sensing means by a said incremental step in response to each of said indications of the impending start of a feature, means connected to said sensing means for advancing said recording medium at a playback speed and replaying a feature in response to each determination by said sensing means that a marking is located in said predetermined position, and for advancing said recording medium at a forward speed which higher than said playback speed upon each failure of said sensing means to locate a marking in said predetermined position.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figure 1:
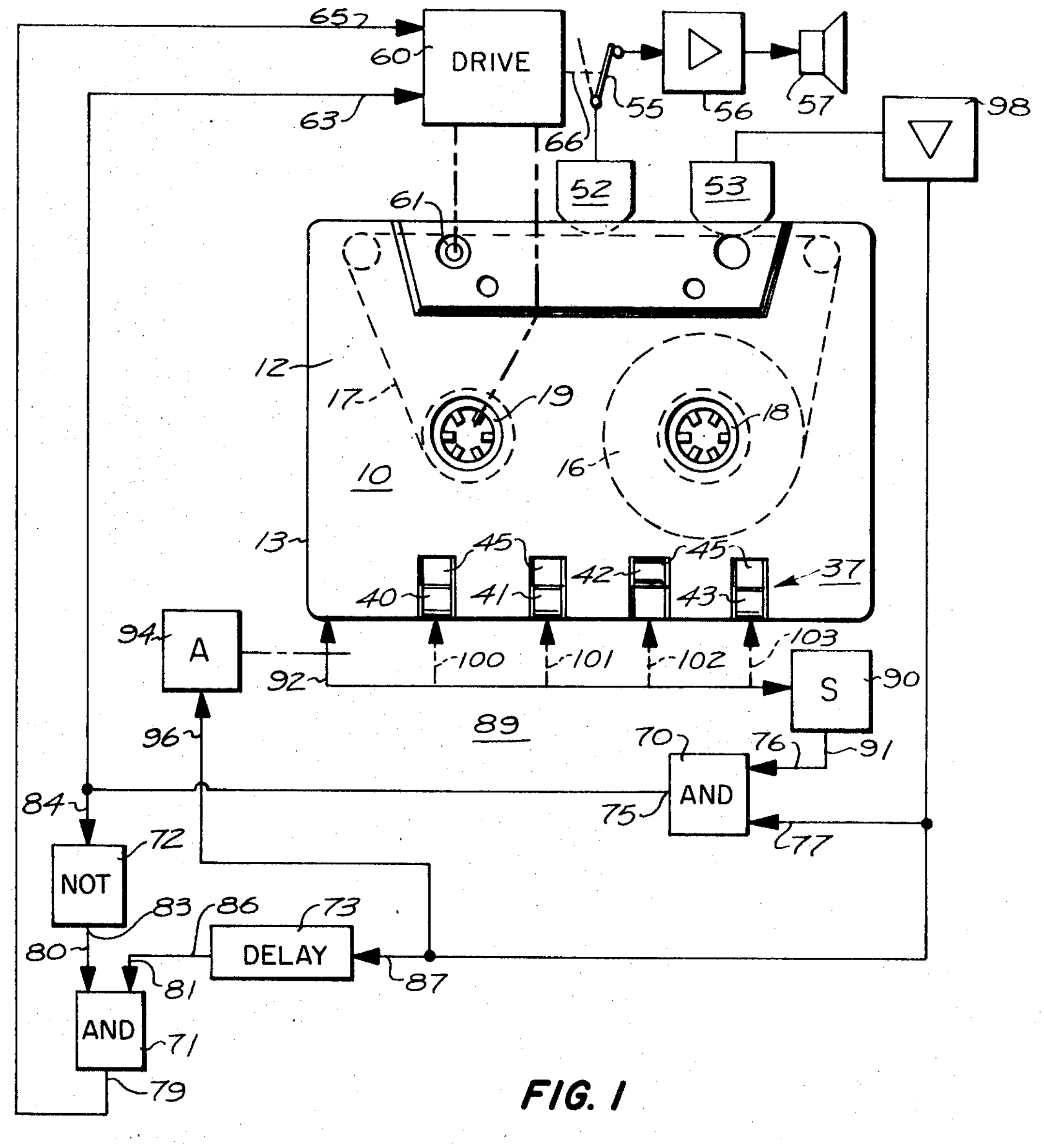
FIG. 1 is a plan view of a tape cassette equipped in accordance with a preferred embodiment of the subject invention and a diagram of related circuitry.
Figure 3:
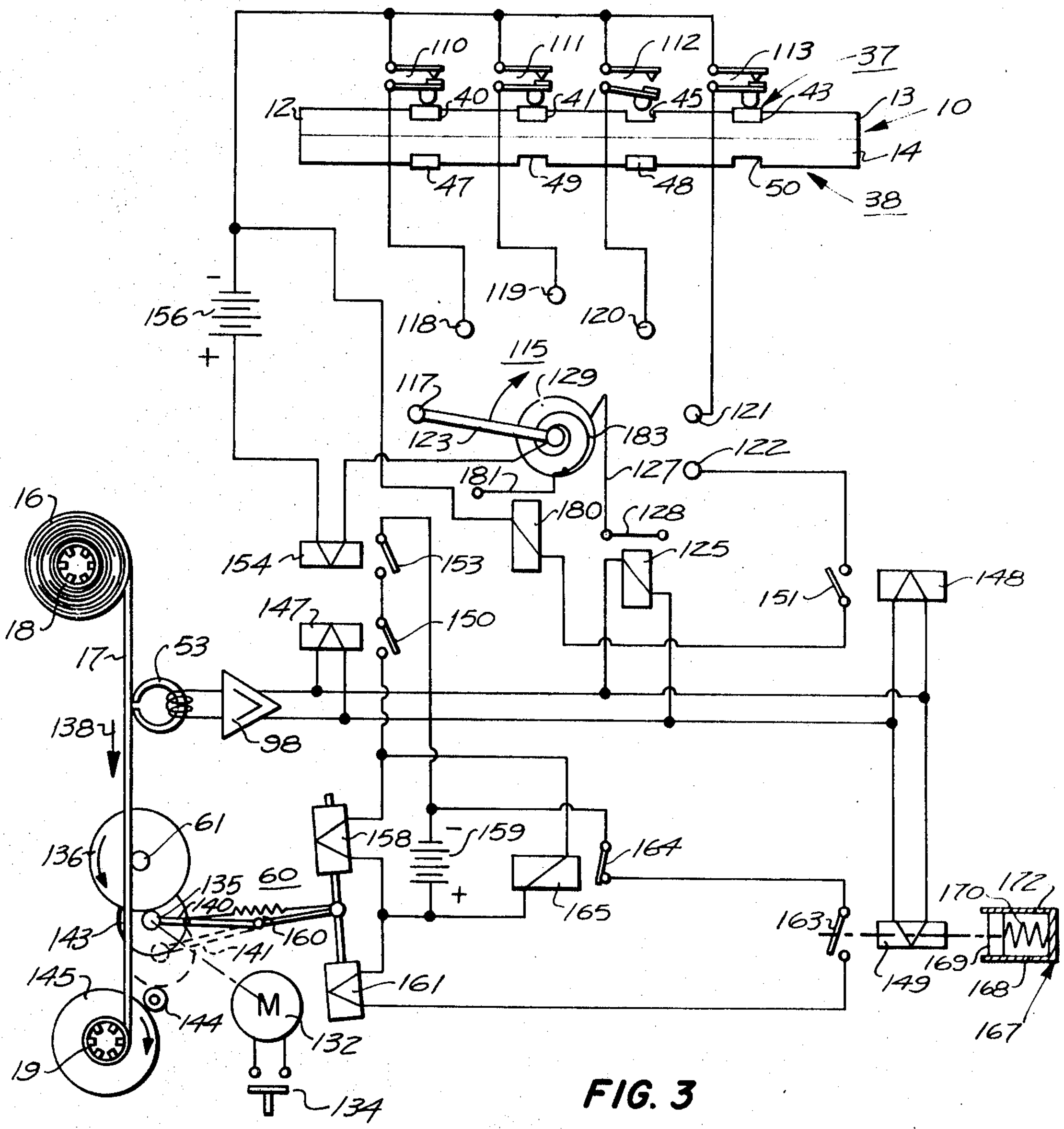
FIG. 3 is an end view of a tape cassette shown in FIG. 1, and a schematic view of related circuitry.

The tape cassette 10 shown in FIGS. 1 and 3 has a casing 12 composed of two mating halves 13 and 14. The casing 12 houses a supply 16 of magnetic recording tape 17 which may be wound from a tape supply retention member 18 unto a tape member 19.

Figure 2:
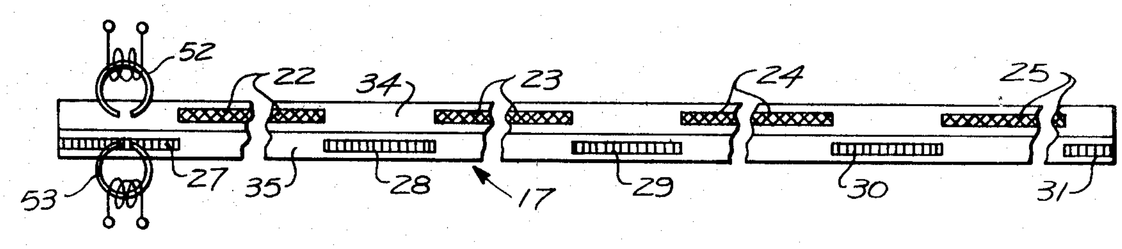
FIG. 2 is a diagrammatic view of a tape for use in the apparatus of FIG. 1.

As indicated in FIG. 2 a number of features 22, 23, 24 and 25, such as musical presentations, is recorded on the tape 17. A number of control signals 27, 28, 29, 30 and 31 is also recorded on the tape 17. Depending on the use to which these control signals are put, they may for instance be said to indicate the beginning or the end of each feature or generally to aid in the selection of features.

In practice, the tape 17 preferably has features recorded in at least two recording channels (or in two double track stereo channels) to permit the playback of information in both directions of tape travel. Each such channel is then provided with its own control signals which are either recorded in a control track or which are recorded in one or more feature channels and arranged or coded so as not to interfere unduly with the playback of recorded features (see U.S. Pat. application Ser. No. 814,110, "Control Signal Recording," filed Apr. 7, 1969, by Dexter P. Cooper, Jr., and assigned to the subject assignee). For the purpose of simplicity, however, only one recording channel 34 with accompanying control signal track 35 is shown in FIG. 2.

As seen in FIG. 3 two adjustable memory registers 37 and 38 are provided on the casing 12 to permit a preselection of feature for replay in either direction of tape movement. As seen in FIG. 1 the register 37 comprises tabs 40, 41, 42 and 43 which are slidably mounted in slots 45 provided in the casing half 13. The tab 40 is allocated to the feature 22 (see FIG. 2), the tab 41 to the feature 23, the tab 42 to the feature 24, and the tab 43 to the feature 25.

Each of these tabs is adjustable between a first position indicative of a preselection for replay of the feature to which the particular tab is allocated, and a second position indicative of a desire to bypass the feature to which that tab is allocated. By way of example, the tabs 40, 41 and 43 are in the first position, indicating that the features 22, 23 and 25 are to be replayed, while the tab 42 is in the second position so that the feature 24 is to be bypassed or excluded from relay.

In FIG. 3 this is illustrated for increased clarity by showing the tabs 40, 41 and 43, but omitting an illustration of the tab 42 and showing only the slot 45 instead.

As far as the memory register 38 shown in FIG. 3 is concerned, tabs 47 and 48 indicate that the second and the fourth features in a second recording channel are to be replayed, while slots 49 and 50 depict a choice to skip the first and third features in that channel.

According to FIG. 2, the features recorded in the channel 34 are replayed by means of a playback head 52, and the control signals in the track 35 are sensed by a playback head 53. The corresponding heads in FIG. 1 bear the same reference characters.

A switch 55 selectively connects the feature playback head 52 to a playback amplifier 56 which drives a loudspeaker 57 for an audible rendition of the replayed features. A tape drive 60 is coupled to a capstan 61 on the one hand, and to the tape takeup member 19 on the other hand. The drive 60, acting through the capstan 61, advances the tape 17 at a playback speed upon energization of the drive 60 through an input 63. By contrast, the drive 60 acts through the takeup member 19 and advances the tape 17 at a fast forward speed, in response to energization of the drive through an input 65.

A coupling 66 extending between the drive 60 and the switch 55 indicates a means for closing this switch during tape advance at playback speed, and for opening this switch during the tape advance at rapid forward speed. In this manner, the features occurring during tape advance at playback speed are replayed, while the playback of features occurring during rapid forward tape advance is skipped and does not generate noise in the loudspeaker 57.

A preferred type of control equipment for reading the memory registers 37 and 38 and correspondingly controlling playback operations will now be described with reference to FIG. 1. To this end, logical circuits representing applied Boolean algebra have been employed. These circuit blocks are well known in the art of cybernetics and automated data processing and, in the instant case, include two AND elements 70 and 71, a NOT element 72, and a DELAY element 73.

The AND element 70 only provides an output signal at 75 when both of its inputs 76 and 77 are energized. Similarly, the AND element 71 only provides an output signal at 79 when both of its inputs 80 and 81 are energized. The NOT element 72 has an output signal at 83 as long as its input 84 is not energized, and provided no output signal at 83 as long as its input 84 is energized.

The DELAY element 73 only provides a signal at 86 when its input 87 has been energized for a predetermined period of time which corresponds to the time required by a searching circuit 89 to determine the presence of a replay command.

In FIG. 1, the replay commands are provided by the positioning of the tabs 40 through 43 and the searching circuit 89 comprises a sensing device 90 which provides an output signal at 91 when its feeler 92 senses the position of any of the tabs 40 through 43 in the aforesaid first position. The searching circuit 89 further includes an actuator 94 which steps the feeler 92 in response to signals received at the actuator input 96.

With reference to FIGS. 1 and 2, the operation of the apparatus of FIG. 1 may be described as follows:

At the beginning of a tape replay operation, the playback head 53 picks up the control signal 27 and applies the same through a suitable playback amplifier 98 to the input 77 of the AND element 70, to the input 87 of the DELAY element 73, and to the input 96 of the actuator 94. This causes the actuator 94 to step the feeler 92 to the position 100 where it senses the location of the tab 40 in its first position. This causes the sensing device 90 to apply a signal to the AND element input 76.

Up to that time, the AND element 70 could not provide an output, since only its input 77 was energized. However both inputs 76 and 77 having now been energized, the AND element 70 provides an output signal to the input 63 of the tape drive 60 which, as mentioned above, causes advance of the tape at a playback speed.

To prevent a contradictory actuation of the drive 60 at this stage, an energization of the drive input 65 which, it will be recalled, causes tape advance at a rapid forward speed, has to be inhibited. This is accomplished by applying the output signal of the AND element 70 not only to the drive 63 as just described, but also to the input 84 of the NOT element 72. This causes the output signal of the NOT element 72 to disappear from the inputs 80 of the AND element 71 so that the same cannot provide an output signal at 79.

Prior to this deenergization of the AND element input 80, the DELAY element 73 prevents an application of the played back control signal to the input 81 of the AND element 71. To this effect, the delay imposed by the element 73 corresponds as mentioned above to the time required by the searching circuit to determine the presence of a relay command.

The drive 60 having been actuated into the playback speed mode, the switch 55 is closed by the link 66 so that the feature 22 is played back by the loudspeaker 57. The control signal 27 ends after a while, but the drive 60 is a bistable device which stays switched on, even after cessation of the input signal at 63.

After the feature 22 has been played back, the control signal 28 is picked up by the head 53. Under the operational principles detailed above, this causes the actuator to step the feeler 92 to the position 101. Since the tab 41 is also in its first position, the function of the sensing device 90 and of the logic elements 70, 71, 72 and 73 again cause the application of a signal to the drive input 63 and the inhibition of a signal application to the drive input 65. The drive 60, which is already in the playback tape advance mode from the replay of the feature 22 will thus remain in this mode so that the feature 23 is played back.

A different situation, however, arises as to the feature 24, since the location of the tab 42 in its second position indicates that the feature 24 is to be skipped. More specifically, the following occurrences take place:

The playback head 53 picks up the control signal 29, whereupon the actuator 94 steps the feeler 92 to the position 102. Since the tab 42 is in its second position, no output signal is produced by the sensing device 90 and the AND element input 76 remains deenergized. In consequence the AND element 70 is not in a position to apply a signal to the tape drive input 63. In addition, the AND element input 80 remains energized since there is no input at 84 which would cause the NOT element 72 to suspend its output at 83.

Accordingly, both inputs 80 and 81 of the AND element 71 are energized upon lapse of the short time delay imposed on the played back control signal by the DELAY element 73. This causes the AND element 71 to apply a signal to the input 65 of the drive 60 which thereupon causes an advance of the tape 17 at a rapid forward speed and an opening of the switch 55.

In consequence, the feature 24 is rapidly bypassed and head 53 thereupon picks up the control signal 30.

If the tab 43 were in its second position, the sensing and control process just described would repeat itself and the tape would be rapidly advanced to its end to be ready for replay in the opposite direction of tape travel. However, since the tab 43 is in its first position, the process described in connection with tabs 40 and 41 repeats itself upon a playback of the control signal 30 and the tape 17 is advanced at playback speed so that the feature 25 is replayed.

A further control signal 31 is provided at the end of the last feature to provide for an energization of the actuator 94 so that the feeler 92 is returned to its initial position preparatory to the next playback operation. The tape 17 may thereupon by played back in its opposite direction, provided features have been recorded thereon in both directions. Alternatively, the control signal 31 may be employed to institute a tape rewind operation preparatory to a selective replay of the features 22 through 25 as dictated by the positions of the tabs 40 through 43.

An analog of the Boolean logic of FIG. 1 is illustrated in FIG. 3. For the sake of simplicity and ease of illustration, FIG. 3 shows the tape 17, tape coil 16 and tape retaining and takeup members 18 and 19 separately from the cassette 10 although it should be understood that these parts are contained in the casing 12. Also, it will be noted that like or functionally equivalent parts as among FIGS. 1 to 3 are designated by like reference numerals.

According to FIG. 3, the position of the tabs 40 through 43 is sensed by a bank of contacts 110, 111, 112 and 113. Each of these contacts is closed when the corresponding tab is in its first position, and is open when such tab is in its second position. Accordingly, if the illustrated tab positions prevail, the contacts 110, 111 and 113 are closed and the contact pair 112 is open as shown.

A stepping switch or selector 115 is the functional equivalent of the actuator 94 of FIG. 1. The selector 115 has a series of contacts 117 through 122 which are successively engaged by a selector arm 123 in response to repeated energization of a stepping motor !25. A dog and pawl mechanism 127 transmits the actuating force of the motor anchor 128 to a ratchet wheel 129.

Initially, the selector arm 123 rests on the quiescent state contact 117. A motor 132 in the tape drive 60 is started by actuation of an on-off switch 134. The torque of the motor 132 is transmitted to the tape capstan 61 by a pulley 135 and a flywheel 136. In consequence, the tape 17 is advanced in the direction of the arrow 138 at a playback speed.

As indicated above, the drive 60 is a bistable device. This means that the pulley mount 140 may either be in the position illustrated in solid lines or in the alternative position indicated in dotted lines 141, depending on whether the last preceding tape advance took place at playback speed or at the alternative fast forward speed. Should the pulley mount 140 happen to be in the alternative position 141, then the torque of the motor 132 would be transmitted to the tape takeup member 19 by a series of gear wheels 143, 144 and 145 for a tape advance at fast forward speed.

In either case, the first control signal 27 (see FIG. 2) is picked up by the playback head 53. Upon amplification at 98, this control signal energizes relays 147, 148 and 149 and the stepping motor 125 of the selector 115. In response to such energization, the relays 147 and 148, respectively, close their contacts 150 and 151.

Closure of the contact 150 is of no consequence at this stage since an open contact 153 of a relay 154 is connected in series with the contact 150. Those familiar with the elements of Boolean logic will recognize that the relays 147 and 154 with their contacts 150 and 153 constitute a functional analog of the AND element 70 of FIG. 1.

Closure of the contact 151 is also of no consequence at this stage and will remain of no consequence until the selector arm 123 has arrived at the contact 122 as will below be described.

Energization of the motor 125, however, causes advancement of the selector arm 123 from the contact 117 to the contact 118. Since the contact 110 is shown as closed in response to the location of the adjustable tab 40 in its first position, the following energization circuit for the relay 154 is established:

Battery 156, sensing contact 110, selector contact 118, selector arm 123, relay 154, and battery 156

This results in a closure of the relay contact 153. Since this contact is in series with the previously closed contact 150 of relay 147, the following energization circuit is established for an actuator 158:

Battery 159, contact 153, contact 150, actuator 158, and battery 159

If the pulley mount 140 already is in its illustrated solid position, then it remains in such position upon energization of the actuator 158. By contrast, if the pulley mount 140 is in its alternative position 141, then the actuator 158 advances the pulley mount 140 to its illustrated solid position. Since the pulley mount 140 is part of an overcenter toggle mechanism 160, the tape advance at playback speed will continue is response to an energization of the actuator 158 even if such actuator is subsequently deenergized when the contact 150 opens upon a cessation of the control signal 27. Since the same applies mutatis mutandis to the fast forward tape advance upon energization of the actuator 161, the bistable character of the tape drive 60 is readily appreciated.

Speaking of the fast forward actuator 161, we may note that energization of this actuator and energization of the play back tape speed actuator 158 are mutually exclusive. At first sight one might question this statement in view of the fact that the relay 149 is immediately energized upon playback of the control signal 27 (see FIG. 2) and that this relay has a contact 163 which is in series with the normally closed contact 164 of a relay 165 which, being connected in parallel to the actuator 158, is only energized upon energization of this actuator in the manner just described.

However, it should be noted at this juncture that the relay 149 includes a delay device 167 which delays the closure of the contact 163 upon energization of the relay 149. In the embodiment illustrated in FIG. 3 the delay device 167 includes a dashpot 168 with a piston 169 and a return spring 170.

Energization of the relay 149 urges the piston 169 into the dashpot 168. The ensuing movement of the piston 169 is restrained by the spring 170 and by the air in the dashpot 168. Both of these forces can be overcome by the relay 149. However since the entrapped air can only escape from the dashpot through a small orifice 172, it takes time for the relay 149 to push the piston 169 sufficiently into the dashpot to effect a closure of the contact 163 which is coupled to the piston 169.

The orifice 172 is constructed or adjusted so that the delay imposed by the device 167 includes the time it takes for the selector 115 and accompanying circuitry to sense whether a particular one of the tabs 40 through 43 is in its first position. If so, the actuator 158 is energized as described above. This, in turn, results in an energization of the relay 165 and a consequent opening of the normally closed contact 164.

The contact 164 having been opened, a closure of the contact 163 upon expiration of the time delay imposed by the device 167 is of no consequence. On the other hand, had the actuator 158 not been energized, then the contact 164 would still be closed when the contact 163 closes and the fast forward actuator 161 would be energized rather than the playback advance actuator 158. It will now be recognized that the relay 165 with its contact 164 is a functional analog of the NOT element 72 shown in FIG. 1, while the relay 149 with its contact 163 and retardation device 167 is, of course, an analog of the DELAY device 73.

Since the tab 40 is in its illustrated first position, the actuator 158 is energized and the tape 17 is thereupon advanced at playback speed, whereupon the feature 22 (see FIG. 2) is played back by the equipment 52, 56 and 57 (see FIG. 1).

When the control signal 28 reaches the head 53 the selector arm 123 is stepped onto the contact 119 and the sensing and control process described above in connection with the sensing contact 110 repeats itself with respect to the contact 111, since the tab 41 is also in its first position. Accordingly, the tape 17 continues to be advanced at playback speed and the second feature 23 is played back.

The third control signal 29 then reaches the head 53. This causes the selector arm 123 to be stepped to the contact 120. Since the tab 42 is in its second position (see FIG. 1) the contact 112 is open so that the battery 156 is prevented from energizing the relay 154. Accordingly, the actuator 158 and the relay 165 remain deenergized. In consequence, the contact 164 will still be closed by the time the contact 163 closes upon expiration of the delay imposed by the device 167. This establishes the following energizing circuit for the fast forward actuator 161:

Battery 159, contact 164, contact 163, actuator 161, and battery 159

This causes actuation of the pulley mount 140 to the alternative position 141 and fast forward movement of the tape 17. The feature 24 (FIG. 2) is thus skipped inasmuch as the drive 60 maintains the switch 55 (see top of FIG. 1) open when operating in the fast forward mode.

The head 53 next encounters the control signal 30 and the selector arm 123 is stepped to the contact 121 for a sensing of the position of the tab 43. Since this tab is in the first position, the playback advance actuator 158 will be energized as was the case with respect to the tabs 40 and 41 which are also in their first position. Accordingly, the feature 25 is played back.

After completion of this playback, the control signal 31 reaches the head 53. This causes the selector arm 123 to be stepped to the contact 122, which establishes the following energization for a homing relay 180:

Battery 156, relay 154, selector arm 123, contact 122, relay contact 151, homing relay 180, battery 156

Since the relay 154 is in series with the homing relay 180, the contact 153 closes in series to the contact 150 which is already closed because of the presence of the control signal 31 at the head 53. Accordingly, the actuator 158 is energized and the tape is slowed down to playback speed. Of course, when the tab 43 is in its illustrated first position, then the tape already is at playback speed when the control signal 31 encounters the head 53. However, the tape would at that instant be at fast forward speed if the tab 43 had been adjusted to its second position and the feature 25 consequently skipped. In that case a slowdown of the tape by energization of the actuator 158 is beneficial since it lessens the impact of a sudden stop on the tape when the end thereof is reached.

The homing relay 180 actuates a pawl 182 which releases the ratchet wheel 129 so that the selector arm 123 can return to its quiescent state at contact 117 by action of a bias spring 183. At the same time, a further tape playback operation may be initiated for a selective playback of another series of recorded features. The homing relay 180 has a time delay so that the release pawl 181 only reengages the ratchet wheel 129 after the selector arm 123 has returned to the contact 117 and the playback of the control signal 31 has been completed.

Those skilled in the art of contemporary electronics will, of course, realize that all the relay circuits shown in FIG. 3 may be replaced by solid-state circuits in accordance with principles well known in the art.

Figure 4:
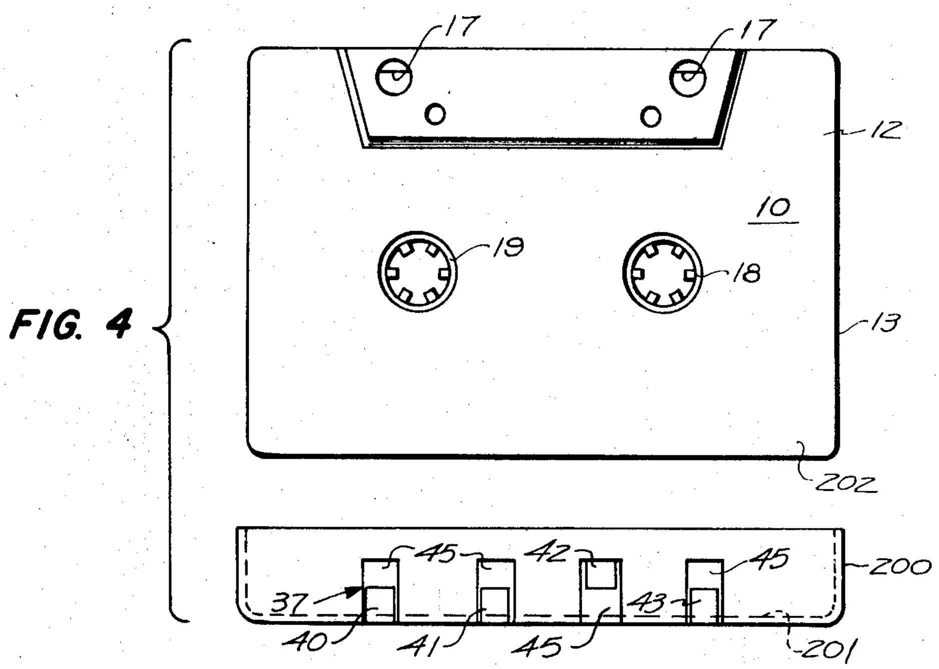
FIG. 4 is a plan view of a conventional tape cassette and of a slip-on memory device according to a further preferred embodiment of the subject invention.

The cassette 10 shown in FIGS. 1 and 3 is preferably provided with the adjustable tabs 40 through 43 during its manufacture. FIG. 4 illustrates means for equipping, with one or more memory registers, cassettes that have been manufactured without such registers (or that have been manufactured with a memory that cannot be sensed with a given type of sensing and control equipment).

According to FIG. 4 a memory register 37 of the type shown in FIGS. 1 and 3 is provided on a support or member 200 which defines a cavity 201 adapted to receive an end portion 202 of the cassette 10. As before, the memory register 37 includes tabs 40 through 43 which are slidable in slots 45 between first and second positions to indicate a desired selection of features for playback.

A memory register 38 of the type shown in FIG. 3 may be provided on the lower side of the support 200 of FIG. 4 to permit a preselection of features for playback in both directions of tape travel. The support 200 may be slide onto the cassette end portion and be designed to form a press fit thereon.

Figure 5:
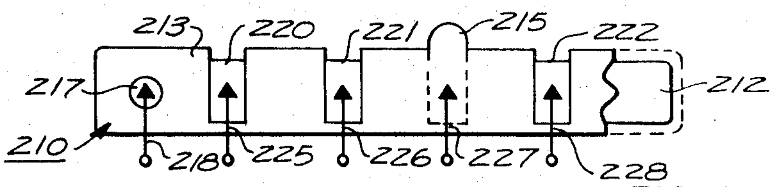
FIG. 5 is a plan view of an attachable memory device according to yet another preferred embodiment of the subject invention, suitable for use with the cassette shown in FIG. 4.

A similar embodiment is shown in FIG. 5. The memory register 210 shown in this figure includes an adhesive metal foil 212 covered by a strip adhesive paper 213. The strip 213 includes perforated tabs, one of which is shown at 215. The register member 210 is applied to a cassette 10 and the perforated tabs are removed from the strip 213 for the features which are desired to be played back.

By way of example, only one tab 215 is shown as having been left on the strip 213. Counting from the left, the first second and fourth tabs are shown as having been removed so that portions 220, 221 and 222 of the foil 212 are exposed. This means that the first, second and fourth feature is desired to be played back, while the third feature is to be skipped.

If desired, the memory register 210 may be sensed electrically. For this purpose, the strip 213 has an aperture 217 through which a metal finger 218 makes contact with the metal foil 212. Further metal fingers 225, 226, 227 and 228 are provided to sense the register 210. Since tabs have been removed at portions 220, 221 and 222, the fingers 225, 226 and 228 are electrically connected to the finger 218 through the metal foil 212. The finger 227, on the other hand, is electrically insulated from the foil 212 and finger 218 by the paper tab 215.

The register 210 of FIG. 5 may be substituted for the register 37 and the bank of contacts 110 through 113 in FIG. 3. In this case, the finger 218 is connected to the negative terminal of the battery 156, while the finger 225 is connected to the selector contact 118, the finger 226 to the selector contact 119, the finger 227 to the selector contact 120, and the finger 228 to the selector contact 121.

This having been done, the sensing and control process for a selective playback and bypassing of features may proceed as described above in connection with FIG. 5.

Figure 6:
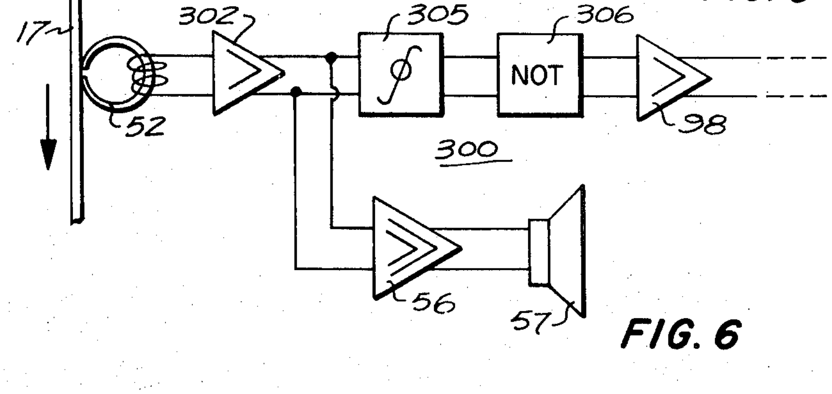
FIG. 6 is a diagram of sensing circuitry which may be used in the apparatus of FIGS. 1 or 3.

It will now be recognized that the term "markings" herein employed for the elements of the memory registers is very broad and includes various kinds of adjustable or attachable members, or removable elements, or selectively coverable devices, or recordable intelligence susceptible to sensing.

Where the provision of control signals on the tape 17 poses problems, the signal absence sensing circuit 300 shown in FIG. 6 may be employed. This circuit includes a preamplifier 302 for amplifying the signals picked up by the playback head 52. It will be recalled at this point that the head 52 plays back the recorded features themselves, rather than control signals. The previously mentioned amplifier 56 and loudspeaker 57 are connected to the preamplifier 302 for a reproduction of the played back features.

The circuit 300 further includes an integrating circuit 305 which integrates the played back features and provides an output signal as long as a feature is being played back. This output signal of the integrating circuit 305 is applied to a NOT circuit 306. This NOT circuit is similar to the above mentioned NOT circuit 72 of the apparatus of FIG. 1 and provides an output signal if it receives no input signal, while provision of the output signal is suspended in response to an input signal.

No output signal is provided by the NOT circuit 306 as long as the integrating circuit 305 has an output signal. However, if no recorded feature is present at the playback head 52, then the integrating circuit 305 ceases to receive an input signal. In consequence, the output signal of the integrating circuit 305 drops to zero. This, in turn, causes the NOT circuit 306 to supply an output signal to the amplifier 98.

This means that the amplifier 98 receives a signal whenever there is an unrecorded space ahead of or behind a recorded feature on the tape. The time constant of the integrator 305 is such that no spurious signals are supplied to the amplifier 98 in response to pianissimo passages in the recorded features.

The amplifier 98 of FIG. 6 may be connected to the relays 147, 148 and 149, and to the stepping motor 125 of FIG. 3, where upon the control signal playback head 53 may be dispensed with and the equipment of FIG. 3 operated with the signal absence sensing circuit 300 of FIG. 6.

While sound tape recordings have been stressed so far, it should be understood that the invention has wider application. For instance, it features may be employed to cause a replay of selected features from video tape recordings. Moreover, these principles may be used to cause a selective display of chosen motion picture features from a motion picture film which may, for instance, be stored in a cartridge on which markings of the above mentioned type are provided. In this respect, the expressions "replay" and "playback" employed herein are intended to be broad enough to cover motion picture displays.

While specific embodiments of the invention have been disclosed and illustrative herein, variations and modifications within the scope and spirit of the invention will be apparent or suggest themselves to those skilled in the art.

We claim:

1. A method of selectively replaying a number of features recorded on a recording medium having a support, comprising in combination:

providing adjustable markings on said support for alternatively indicating preselections of said features for replay;
adjusting said markings for indicating a choice of one of said preselection of features for replay;
sensing the impending start of each feature;
instituting a feature replay operation; and
controlling said feature replay operation in accordance with the adjustment of said markings and said sensing of the impending start of each feature to effect a replay of said chosen preselection of features.

2. A method as claimed in claim 1, including the further steps of:

readjusting said markings for indicating a choice of another of said preselections of features for replay;
resensing the impending start of each feature;
instituting a further feature replay operation; and
controlling said further feature replay operation in accordance with the readjustment of said markings and said resensing of the impending start of each feature to effect a replay of said chosen other preselection of features.

3. A method as claimed in claim 1, wherein:

said support is a casing for said recording medium; and
said markings are provided on said casing.

4. A method as claimed in claim 1, including the steps of:

providing a pause on said recording medium ahead of each of said features; and
sensing the impending start of each feature by sensing said pause ahead of each feature.

5. A method as claimed in claim 1, including the steps of:

recording a control signal on said recording medium ahead of each of said features; and
sensing the impending start of each feature by sensing said control signal.

6. A method of selectively replaying a number of features recorded on a recording medium having a support, comprising in combination:

providing adjustable markings on said support for alternatively indicating preselections of said features for replay;
adjusting said markings for indicating as to each feature whether the particular feature is to be replayed or is to be bypassed;
sensing the impending start of each feature;
sensing said markings and advancing said recording medium at a playback speed in response to an indication that a feature is to be replayed and in response to a sensing of the impending start of that feature, and alternatively advancing said recording medium at a forward speed which is higher than said playback speed in response to an indication that a feature is to be bypassed; and
replaying the features during which said recording medium is advanced at said playback speed.

7. A method as claimed in claim 6, wherein:

said support is a casing for said recording medium; and
said markings are provided on said casing.

8. A method as claimed in claim 6, including the steps of:

providing a pause on said recording medium ahead of each of said features; and
sensing the impending start of each feature by sensing said pause ahead of each feature.

9. A method as claimed in claim 6, including the steps of:

recording a control signal on said recording medium ahead of each of said features; and
sensing the impending start of each feature by sensing said control signal.

10. A method of selectively replaying a number of features recorded on a recording medium having a support, comprising in combination:

providing for each feature a marking on said support adjustable between a first position indicative of a preselection of a particular feature for replay, and a second position indicative of a desire to bypass the particular feature;
adjusting each of said markings to designate each feature selectively for playback and for bypassing, respectively;
instituting a playback operation;
determining the impending start of each feature during said playback operation and instituting in response to each determination of the impending start of a feature a sensing operation for determining the position of the marking for the particular feature;
advancing said recording medium at a playback speed in response to a determination that a marking is in said first position, and alternatively advancing said recording medium at a forward speed which is higher than said playback speed in response to a determination that a marking is in said second position; and
replaying the features during which said recording medium is advanced at said playback speed.

11. A method as claimed in claim 10, wherein:
said support is a casing for said recording medium; and
said markings are provided on said casing.

12. A method as claimed in claim 10, including the steps of:
providing a pause on said recording medium ahead of each feature; and
determining the impending start of each feature by sensing said pause ahead of each feature.

13. A method as claimed in claim 10, including the steps of:
recording a control signal on said recording medium ahead of each of said features; and
determining the impending start of each feature by sensing said control signal.

14. Apparatus for selectively replaying a number of features recorded on a recording medium having a support and including indications of the impending start of each feature, comprising in combination:
adjustable markings on said support for alternatively indicating preselections of said features for replay;
means for sensing said impending start indications on said recording medium;
means connected to said sensing means for determining from said adjustable markings in response to each sensed impending start indication whether a particular feature is to be replayed; and
means connected to said determining means for effecting a replay of each feature determined by said determining means for replay.

15. Apparatus as claimed in claim 14, wherein:
said support is a casing for said recording medium; and
said markings are provided on said casing.

16. Apparatus as claimed in claim 14, wherein:
said support is a casing for said recording medium; and
said markings are provided on at least one member selectively attachable to said casing.

17. Apparatus for selectively replaying a number of features recorded on a recording medium having a support and including indications of the impending start of each feature, comprising in combination:
adjustable markings on said support for indicating as to each feature whether the particular feature is to be bypassed;
means responsive to said indications on said recording medium for effecting a sensing of said markings in response to each indication of an impending start of a particular feature to determine whether the particular feature is to be replayed;
means connected to said sensing means for advancing said recording medium at a playback speed in response to an indication that a particular feature is to be replayed; and
means operatively associated with said recording medium for replaying the features during which the recording medium is advanced at said playback speed.

18. Apparatus as claimed in claim 17, wherein:
said support is a casing for said recording medium; and
said markings are provided on said casing.

19. Apparatus as claimed in claim 17, wherein:
said support is a casing for said recording medium; and
said markings are provided on at least one member selectively attachable to said casing.

20. Apparatus for selectively replaying a number of features recorded on a recording medium having a support and including for each feature an indication of the impending start of the particular feature, comprising in combination:
a sequence of markings on said support, each marking being individually allocated to a feature and being selectively adjustable to a predetermined position to indicate that the particular feature is to be replayed;
means for sequentially sensing said markings in incremental steps to determine as to each marking whether the particular marking is located in said predetermined position;
means operatively associated with said recording medium and connected to said sensing means for actuating said sensing means by a said incremental step in response to each of said indications of the impending start of a feature;
means connected to said sensing means for advancing said recording medium at a playback speed and replaying a feature in response to each determination by said sensing means that a marking is located in said predetermined position, and for advancing said recording medium at a forward speed which is higher than said playback speed upon each failure of said sensing means to locate a marking in said predetermined position.

21. Apparatus as claimed in claim 20, wherein:
said support is a casing for said recording medium; and
said markings are provided on said casing.

22. Apparatus as claimed in claim 20, wherein:
said support is a casing for said recording medium; and
said markings are provided on at least one member selectively attachable to said casing.

PO-1050
(5/69)

UNITED STATES PATENT OFFICE
CERTIFICATE OF CORRECTION

Patent No. 3,601,556 Dated August 24, 1971

Inventor(s) Dexter P. Cooper, Jr. and Arthur Rak

It is certified that error appears in the above-identified patent and that said Letters Patent are hereby corrected as shown below:

Column 2, line 33, "markings" should be --marking--. Column 2, line 37, "features which" should be -- features during which --. Column 3, line 14, after "which" insert --is--. Column 3, line 72, "feature " should be -- features --. Column 4, line 57, "provided" should be --provides --. Column 5, line 27, "relay" should be --reply --. Column 5, line 61, "played back" should be --played-back--. Column 6, line 4, "by" should be --be --. Column 7, line 17, "play back" should be --play-back--. Column 8, line 37, "pawl 182" should be --pawl 181 --. Column 8, line 67, "slide" should be --slid --. Column 9, line 63, "where upon" should be --whereupon --. Column 9, line 68, "it" should be --its --. Column 10, line 2, "illustrative" should be --illustrated --. Column 12, line 5, after "be" insert -- replayed or is to be --.

Signed and sealed this 25th day of December 1973.

(SEAL)
Attest:

EDWARD M. FLETCHER, JR.
Attesting Officer

RENE D. TEGTMEYER
Acting Commissioner of Patents